(12) United States Patent
Sakano et al.

(10) Patent No.: US 7,510,795 B2
(45) Date of Patent: Mar. 31, 2009

(54) SEPARATOR, FUEL CELL, AND CONNECTION CONSTRUCTION BETWEEN CELL VOLTAGE MEASUREMENT DEVICE SIDE TERMINAL AND FUEL CELL SIDE TERMINAL

(75) Inventors: Masaaki Sakano, Utsunomiya (JP);
Hideaki Kikuchi, Kawachi-gun (JP);
Toshiaki Ariyoshi, Utsunomiya (JP);
Keisuke Andou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 860 days.

(21) Appl. No.: 10/943,073

(22) Filed: Sep. 15, 2004

(65) Prior Publication Data
US 2005/0118481 A1  Jun. 2, 2005

(30) Foreign Application Priority Data
Sep. 19, 2003  (JP) ............................. 2003-328917
Sep. 19, 2003  (JP) ............................. 2003-328919

(51) Int. Cl.
*H01M 8/02* (2006.01)
*H01M 8/10* (2006.01)
*H01M 2/14* (2006.01)

(52) U.S. Cl. ............................. 429/34; 429/32; 429/35; 429/38; 429/39; 429/26

(58) Field of Classification Search ........................ None
See application file for complete search history.

(56) References Cited

U.S. PATENT DOCUMENTS 6,805,986 B2  10/2004  Kuroki et al.

7,344,792 B2 *  3/2008  Barton et al. ................. 429/32

FOREIGN PATENT DOCUMENTS

| JP | 9-283166 | 10/1997 |
| JP | 10-199551 | 7/1998 |
| JP | 11-339828 | 12/1999 |

(Continued)

OTHER PUBLICATIONS

On-line translation of JP2001-256991, Sep. 21, 2001.*

(Continued)

*Primary Examiner*—Dah-Wei D Yuan
*Assistant Examiner*—Katherine Turner
(74) *Attorney, Agent, or Firm*—Lahive & Cockfield, LLP; Anthony A. Laurentano, Esq.

(57) ABSTRACT

In this fuel cell, among a pair of separators in which an electrically conductive portion which is made from an electrically conducting material is surrounded by an insulating portion which is made from an insulating material, a cell side terminal is provided in the inner surface of the insulating portion of at least one said separator, and extends from its interior circumferential side to its outer perimeter side, and is able to electrically connect the interior and exterior of the cell. This cell side terminal is made from a metallic plate, and its inner circumferential side end portion contacts the membrane electrode assembly, while its outer perimeter side end portion extends to the outer perimeter side of the insulating portion. This outer perimeter side end portion can be connected to a measurement side terminal.

15 Claims, 7 Drawing Sheets

FOREIGN PATENT DOCUMENTS

| | | | |
|---|---|---|---|
| JP | 2000-223141 | | 8/2000 |
| JP | 2002-75396 | | 8/2000 |
| JP | 2001-185168 | | 7/2001 |
| JP | 2001-185173 | | 7/2001 |
| JP | 2001-256991 | * | 9/2001 |
| JP | 2002-313399 | | 10/2002 |
| JP | 2002-358993 | | 12/2002 |
| JP | 2003-109649 | | 4/2003 |
| JP | 2003-115304 | | 4/2003 |
| JP | 2004-362860 | | 12/2004 |
| WO | WO-02/01659 A1 | | 1/2002 |

OTHER PUBLICATIONS

On-line translation of JP2001—185273, Jul. 6, 2001.*
Japanese Office Action for Application No. 2003-328919, dated Oct. 2, 2007.
Japanese Office Action for Application No. 2003-328917, dated Dec. 21, 2007.

* cited by examiner

SEPARATOR, FUEL CELL, AND CONNECTION CONSTRUCTION BETWEEN CELL VOLTAGE MEASUREMENT DEVICE SIDE TERMINAL AND FUEL CELL SIDE TERMINAL

BACKGROUND OF THE INVENTION

1. Field of the Invention

The present invention relates to a separator for a fuel cell in which an electrically conductive portion which includes an electrode surface portion is arranged to be surrounded by an insulating portion, to a fuel cell which sandwiches a membrane electrode assembly with said separator, and to a connection construction between a terminal on a cell voltage measurement device side and a terminal on a fuel cell side.

The present application claims the priority rights of Japanese Patent Application 2003-328917 filed upon 19 Sep. 2003 and Japanese Patent Application 2003-328919 filed upon 19 Sep. 2003, and incorporates the contents thereof herein by reference.

2. Background Art

There is a type of fuel cell which is made as a unit fuel cell (hereinafter termed a "unit cell") in which, for example, a solid polymerelectrolyte layer is sandwiched between an anode side electrode and a cathode side electrode, and furthermore a separator is provided on the outside thereof.

In order to ensure that an appropriate voltage should be generated, during actual use, this type of fuel cell is often utilized in a fuel cell stack (hereinafter termed a "stack") in which a plurality of said unit cells are stacked together; and, in such a case, it is necessary to measure the cell voltages in order to monitor the electrical generating state of each of the unit cells.

Since an electrically conductive material such as, for example carbon or a metal or the like is used for a prior art separator (hereinafter this will be termed an "electrically conductive separator"), it has been possible to measure the cell voltage from the outside easily, by forming a portion of the separator in the form of a cell voltage measurement terminal, or by opening a round hole in the outer peripheral surface of the separator, and by connecting one end of an output terminal to this round hole by a banana clip (Patent Document 1: Japanese Unexamined Patent Application, First Publication No. H9-283166).

However, in the case of utilizing a stack which employs this electrically conductive separator, due to the potential difference between the unit cells, since there is the possibility that leakage current (seepage) or an electrical short circuit may occur along a flow conduit for the cooling water (the cooling medium), accordingly the cooling water is required to be endowed with a high level of insulating characteristic, so that a necessity arises to provide an ion exchanger in order to eliminate electrically conductive ions.

As a countermeasure to this, in recent years, the plan has been put forward to utilize an electrically conductive material such as a metal or the like in the contacting portions in the electrodes (the electrode surface portions), and to utilize an insulating material in the portions which form the communication holes for the reaction gas and the cooling water at portions surrounding the electrode surface portions; in other words, a compound type separator has been proposed.

If the stack is made by using these compound type separators, since the cooling water edge surface distance (the insulating distance) between the unit cells becomes long, apart from a high degree of insulating characteristic no longer being required from the cooling water, it is also possible to suppress the generation of rust upon the metallic separators. Furthermore, it is possible effectively to prevent the occurrence of short circuiting with the outside, since the outer edge portions of the separators are made from an insulating material.

Since, in this manner, with said compound type separators, the outer sides in the surface direction of the electrode surface portions (the outer peripheral sides of the separators) are made with an insulating construction, accordingly there is the strong point that it is possible effectively to prevent the occurrence of electrical seepage due to the cooling water or shorting to the exterior; but, on the other hand, the accompanying shortcoming is also entailed that the measurement of the cell voltage becomes extremely difficult.

Due to this situation, there is a requirement for development of a technique in order to make it possible to observe the state of electrical generation by each unit cell, while preventing electrical seepage and short circuiting.

SUMMARY OF THE INVENTION

The present invention has been conceived in the light of the above described circumstances, and it takes as its objective to make it possible to measure the cell voltage easily from the outside, while preventing electrical seepage of the cooling medium and shorting to the outside.

In order to solve said problems, the present invention utilizes the following means.

The present invention is a separator for a fuel cell having an electrically conductive portion having an electrode surface portion, and an insulating portion which surrounds said electrically conductive portion, wherein, in said insulating portion, there is provided an inside to outside junction terminal which extends from its inner circumferential side to its outer perimeter side.

According to this structure, even though, due to the insulating portion, the fuel cell is constructed so as to implement prevention of ground faults with the exterior, if the terminal of the cell voltage measurement device is connected to the outer perimeter side end portion of the inside to outside junction terminal, then it is possible easily to take out the potential from externally, since the interior and the exterior of the fuel cell are reliably electrically connected.

With the present invention, at least a portion of said inside to outside junction terminal may be embedded in said insulating portion.

According to this structure, since a portion of the inside to outside junction terminal is made to be integral with the separator, there is no requirement to attach the inside to outside junction terminal to a separator which is provided as a separate component, and it is possible to reduce the number of processes during assembly. Furthermore, positional deviation of the inside to outside junction terminal with respect to the separator does not occur, and it is easy to maintain a desirable electrical contact state with respect to the membrane electrode assembly and/or the electrically conductive portion.

With the present invention, said inside to outside junction terminal may be embedded in said insulating portion at a sealing contact face of said insulating portion.

According to this structure, since the inside to outside junction terminal is not exposed to the sealing contact face at which the seal member is contacted to the insulating portion, it is possible to suppress concave and convex formations upon the sealing contact face, and it is possible to enhance the reliability of the sealing performance.

With the present invention, there may be further a connection portion made of an elastic material between said electrically conductive portion and said insulating portion.

According to this structure, since it is possible to absorb differences of thermal expansion which can arise between the insulating portion and the electrically conductive portion when change of temperature occurs by the connection portion, accordingly, while effectively preventing breakage of the connection boundary, it is also possible to maintain a desirable sealing performance.

With the present invention, said insulating portion may have connection holes which conduct a reaction gas or a cooling medium.

According to this structure, along with effectively preventing seepage due to the cooling medium which is flowing in the cooling holes by the insulating portion, it is also possible easily to take out the potential from the outside.

And, the present invention is a fuel cell which has a membrane electrode assembly to which electrodes are provided on both sides of an electrolyte, and a pair of separators which sandwich said membrane electrode assembly, wherein a separator as described above is utilized for at least one of said separators.

According to this structure, along with effectively preventing seepage due to the cooling medium and ground faults to the exterior by the insulating portion, it is also possible easily to take out the potential from the outside.

And, the present invention is a fuel cell having:

a membrane electrode assembly in which electrodes are provided on both sides of an electrolyte; and a pair of separators which have electrically conductive portions which have electrode surface portions, and insulating portions which surround said electrically conductive portions, and which sandwich said membrane electrode assembly; and wherein, in at least one of said insulating portions of said separator, an inside to outside junction terminal is provided which extends from its inner circumferential side to its outer perimeter side, and its inner circumferential side end portion is contacted to said multi electrode layer assembly or said electrically conductive portion.

Since, according to this structure, if the terminal of a cell voltage measurement device is connected to the outer perimeter side end portion of the inside to outside junction terminal, the inner circumferential side end portion of the inside to outside junction terminal becomes the contact point with the membrane electrode assembly or the electrically conductive portion, accordingly, even for a fuel cell which implements prevention of ground faults with the exterior by an insulating portion, the electrical connection between the inside and the outside of the fuel cell is guaranteed, and it is possible easily to take out its potential from its outside.

With the present invention, a seal member may be provided at the surface on the opposite side of said membrane electrode assembly from the one contacted by the inner circumferential side of said inside to outside junction terminal.

According to this structure, it is possible to ensure the contact between the inside to outside junction terminal and the membrane electrode assembly, due to the elastic restoring force from the seal member.

With the present invention, said insulating portions may have communication holes which conduct a reaction gas or a cooling medium.

According to this structure, along with effectively preventing seepage due to the cooling medium which is flowing in the cooling holes by the insulating portion, it is also possible easily to take out the potential from the outside.

And, the present invention is a connection construction between a cell voltage measurement device side terminal and a fuel cell side terminal, wherein said fuel cell, along with being made by sandwiching a membrane electrode assembly to which electrodes are provided on both sides of an electrolyte by a pair of separators in which an electrically conductive portion which has an electrode surface portion comes to be surrounded by an insulating portion, also is provided, in at least one of the insulating portions of said pair of separators, with an inside to outside junction terminal which extends from its inner peripheral side to its outer perimeter side and moreover of which an inner circumferential side end portion contacts against said membrane electrode assembly and/or said electrically conductive portion; and wherein, at said terminal on said cell voltage measurement device side, there is provided a terminal electrode which is inserted in between the insulating portions of said pair of mutually opposing separators in a state in which it is elastically compressed in its gap direction, and is pressed against the outer perimeter side end portion of said inside to outside junction terminal due to its elastic restoring force.

Since, according to this structure, even for a fuel cell which implements prevention of ground faults with the exterior by an insulating portion, if the terminal of a cell voltage measurement device is connected to the outer perimeter side end portion of the inside to outside junction terminal, then the electrical connection between the inside and the outside of the fuel cell is guaranteed, accordingly it is possible easily to take out its potential from its outside.

Furthermore, since a sufficient contact pressure is maintained between the terminal electrode of the cell voltage measurement device side and the outer perimeter side end portion of the inside to outside junction terminal, accordingly the contact resistance is also kept low.

Yet further, since the reliability of the electrical connection is maintained even against disturbance such as mutual separation of the terminal on the cell voltage measurement device side from the fuel cell due to vibration or shock or the like, accordingly it is possible to perform the cell voltage measurement at high accuracy.

With the present invention, said insulating portions may have communication holes which conduct a reaction gas or a cooling medium.

According to this structure, along with effectively preventing seepage due to the cooling medium which is flowing in the cooling holes by the insulating portion, it is also possible easily to take out the potential from the outside.

THE PREFERRED EMBODIMENTS

In the following the preferred embodiments of the present invention will be explained with reference to the appended drawings.

Figure 1:
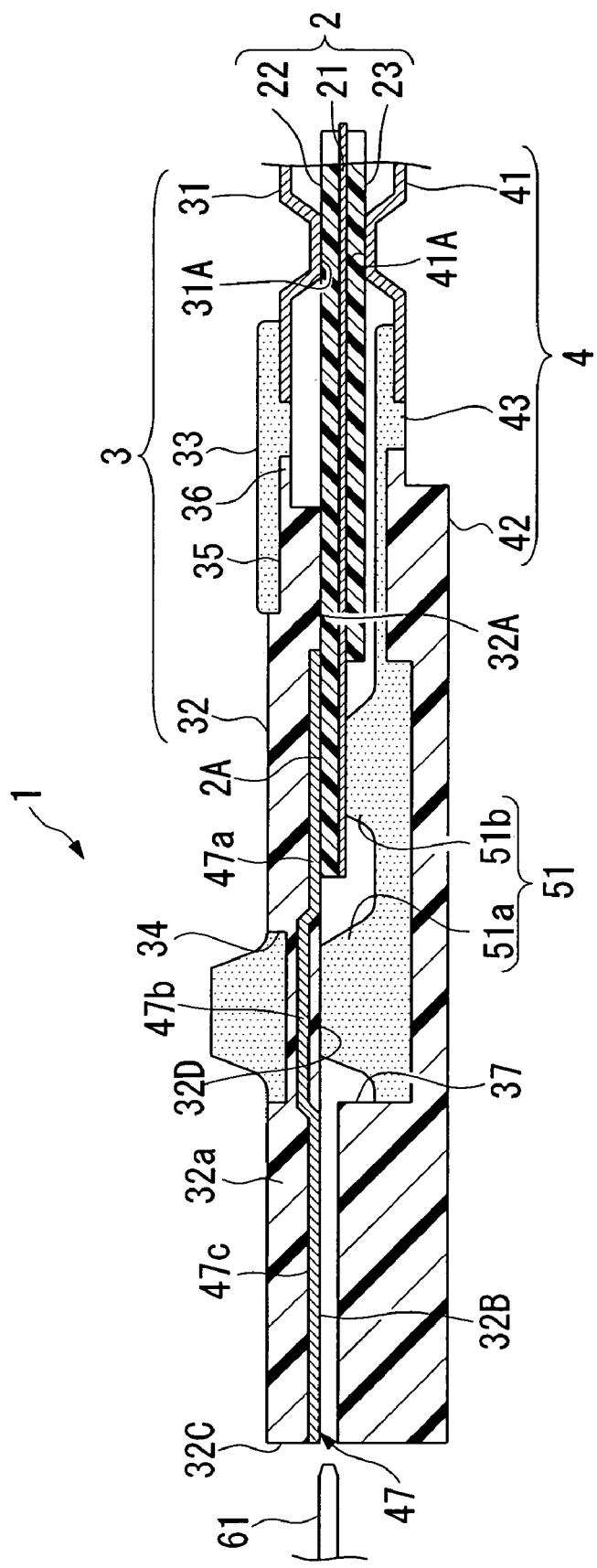
FIG. 1 is a vertical sectional view showing a portion of a fuel cell according to an embodiment of the present invention.

FIG. 1 is a vertical sectional view of a unit fuel cell according to an embodiment of the present invention.

This unit fuel cell (hereinafter termed a "unit cell 1") has a membrane electrode assembly (MEA) 2 and a cathode side separator 3 and an anode side separator 4 which sandwich it.

Figure 3:
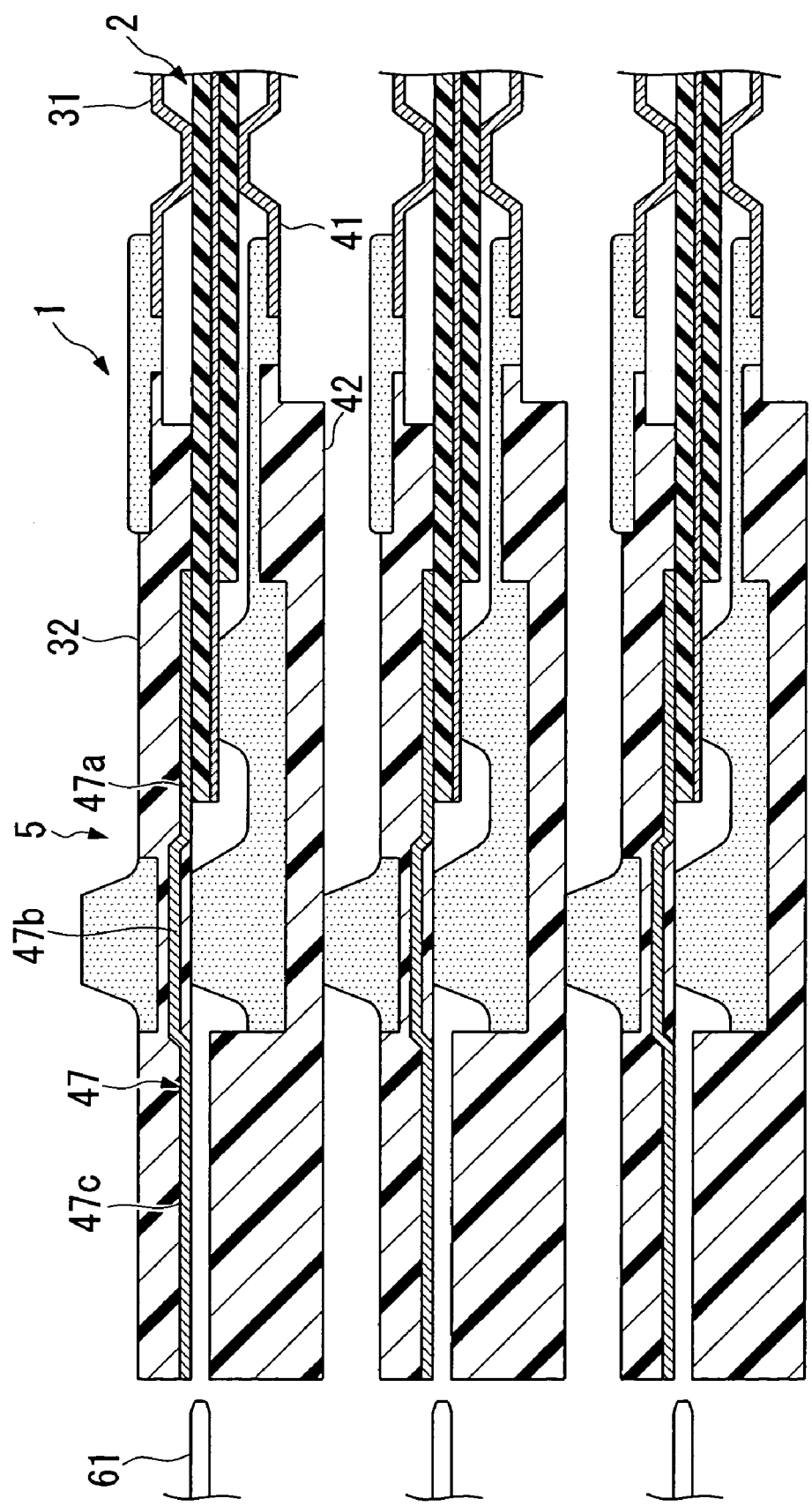
FIG. 3 is a vertical sectional view showing a portion of a fuel cell stack which is constructed by stacking up a plurality of the fuel cells shown in FIG. 1.

And a fuel cell stack (hereinafter termed a "stack 5") for a vehicle or the like, for example, is formed by stacking up a large number of these unit cells 1 as shown in FIG. 3.

The membrane electrode assembly 2 is made to have a solid polymerelectrolyte layer 21, a cathode side gas diffusion electrode 22 and an anode side gas diffusion electrode 23 which sandwich this solid polymerlectrolyte layer 21 from its outer sides, and a catalyst layer (not shown in the figures) including platinum which is provided between this solid polymerelectrolyte layer 21 and the cathode side and anode side gas diffusion layers 22 and 23.

In this membrane electrode assembly 2, when the outer dimensions of the solid polymerelectrolyte layer 21 are taken as a reference, the cathode side gas diffusion electrode 22 is approximately of the same dimensions, but the anode side gas diffusion electrode 23 is made to be of somewhat smaller dimensions, thus resulting in a stepped structure.

In the cathode side separator 3 and the anode side separator 4, electrically conductive portions 31, 41 which are both made from a metal (for example, stainless steel, hastelloy, Inconel, Au, Cu, Ni, Al, Ti, or the like) and insulating portions 32, 42 which are made from a resin material and which are provided so as to surround the outer perimeters of said electrically conductive portions 31, 41 are mutually connected together via connection portions 33, 43 which are made from an elastic material such as, for example, silicon rubber or the like.

The cathode side and the anode side electrically conductive portions 31 and 41 are formed, by press forming metal plates, in wave form in cross section, with alternating flattened hill portions and valley portions. The outer surface of each of the valley portions of the electrically conductive portions 31 and 41 is in surface contact with each of the outer surfaces of the membrane electrode assembly 2 which is sandwiched between them, and said contact surface forms electrode surface portions 31A and 41A formed at each of said separators 3 and 4.

These electrically conductive portions 31 and 41 are not limited to being made from metal; it will be acceptable for them to be made from an electrically conductive material, such as carbon or an electrically conductive resin or the like.

Figure 2:
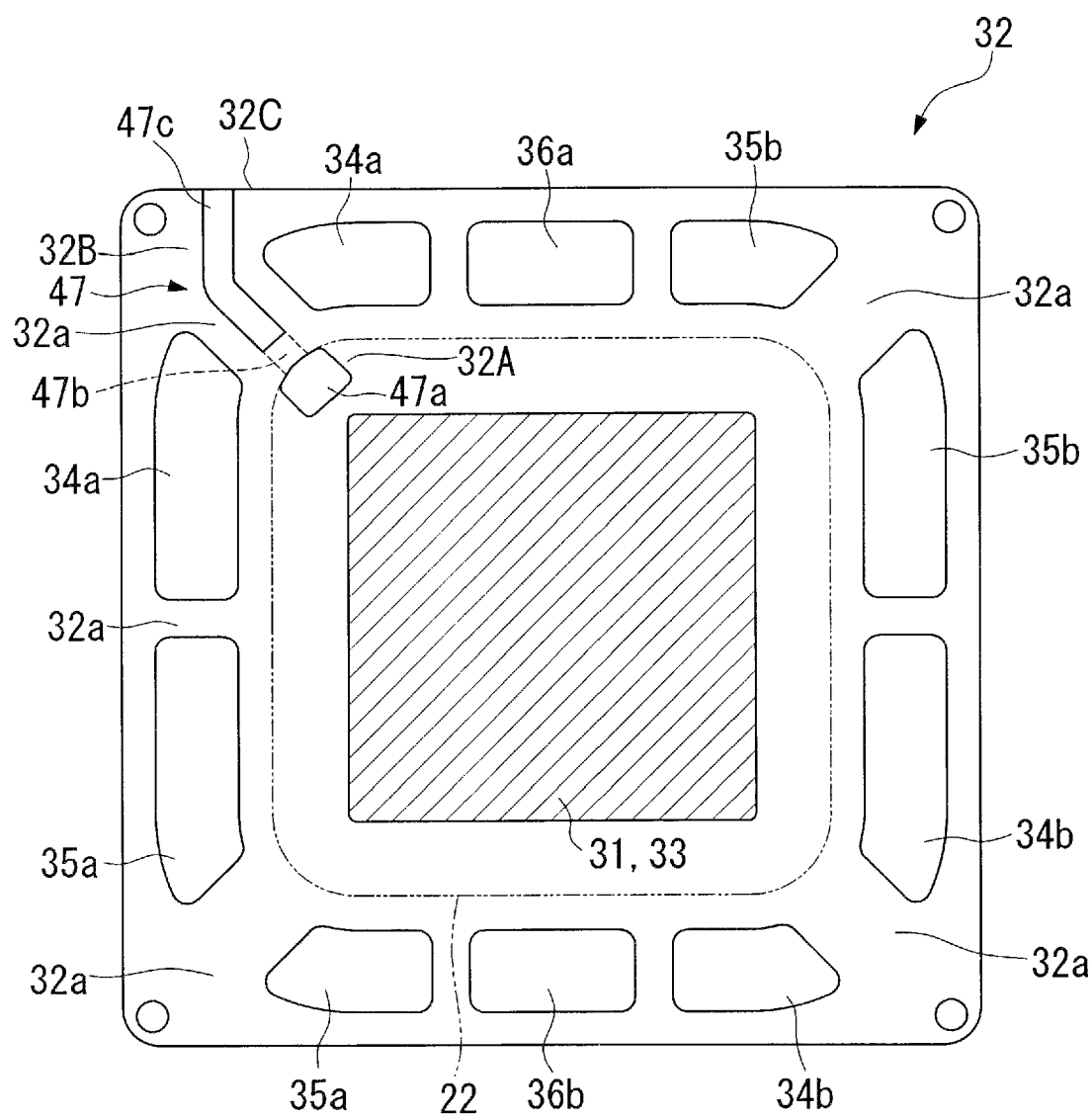
FIG. 2 is a plan view as seen from the inner surface side (the electrode surface portion side) of a cathode side separator shown in FIG. 1.

The insulating portions 32, 42 of the cathode side and the anode side separators 3 and 4, as shown in FIG. 2, are formed by injection molding resin in a rectangular frame shape which has input aperture side oxidizer gas communication holes 34a, output aperture side oxidizer gas communication holes 34b, input aperture side fuel gas communication holes 35a, output aperture side fuel gas communication holes 35b, input aperture side cooling water communication holes 36a, and output aperture side cooling water communication holes 36b, each at a spacing in the circumferential direction. It should be understood that FIG. 2 shows the cathode side separator 3.

These insulating portions 32, 42 are not limited to being made of resin; it would also be acceptable for them to be made from an insulating material such as rubber, silicon, ceramics, or the like.

In this embodiment, a cell side terminal (an inside to outside junction terminal) 47 which is capable of electrically connecting (communicating together) the interior and the exterior of the cell, and which is made from a metal plate is provided upon the inner surface side of the cathode side insulating portion 32; and a rib shaped seal member (a seal member) 51 which is disposed so as to surround said electrode surface portions 31A and 41A doubly is provided upon the insulating portion 42 on the anode side.

In this cell side terminal 47, the resin portion 32a, which constitutes the main body of the cathode side insulating portion 32, is made by injection molding or the like in advance, and an electrically conductive material is provided upon this resin portion 32a by performing some type of surface processing such as partial plating or vapor deposition by PVD or CVD or the like.

In the following the cathode side and the anode side will be treated separately, and the structure of each thereof will be explained in detail.

In the cathode side insulating portion 32, its interior surface (its surface on the side of the electrode surface portion 31A) is roughly coplanar with the electrode surface portion 31A of the cathode side electrically conductive portion 31, and, when the membrane electrode assembly 2 is sandwiched with the pair of separators 3, 4 from its outside, so as to assemble the unit cell 1, the inner circumferential side inner surface 32A of the cathode side insulating portion 32 which is more to the inside than the roughly central portion thereof in the surface direction, and the electrode surface portion 31A of the cathode side electrically conductive portion 31, are tightly held in the membrane electrode assembly 2.

A cell side terminal 47 which is provided upon the inner surface side of the cathode side insulating portion 32 is formed in a unitary fashion with the resin portion 32a by so called resin insert molding, and the construction is such that the flatness of said inner circumferential side inner surface 32A which comes to be in contact with the cathode side outer surface 2A of the membrane electrode assembly 2 is as is desired, and moreover the heights of each of said inner side circumferential side inner surface 32A and said valley portion outer surface 31A are equal, with no step between them.

From the point of view of effectively preventing leakage of the cooling water (cooling medium) which is flowing through the input aperture side and the output aperture side cooling water communication holes 36a and 36b, it is desirable for the position of insertion into the resin portion 32a of the cell side terminal 47 to be separated from the portion surrounding these two cooling water communication holes 36a and 36b; and, in this embodiment, as shown in FIG. 2, the cell side terminal 47 is formed as inserted into the resin portion 32a between the two input aperture side oxidizer gas communication holes 34a, 34a.

The insertion position of the cell side terminal 47 is not limited to being the position shown in FIG. 2; it would also be acceptable for it to be in any of the resin portions 32a between the two output aperture side oxidizer gas communication holes 34b, 34b, or between the two input aperture side fuel gas communication holes 35a, 35a, or between the two output aperture side fuel gas communication holes 35b, 35b, or between the input aperture side or output aperture side oxidizer gas communication holes 34a, 34b and the output aperture side or input aperture side fuel gas communication holes 35b, 35a.

The inner circumferential side end portion 47a of the cell side terminal 47 is its portion which contacts with the cathode side outer surface 2A of the membrane electrode assembly 2, and is exposed to the inner circumferential side inner surface 32A of the cathode side insulating portion 32.

By contrast to this, in the rib shaped seal member 51 which is provided between the anode side insulating portion 42, in a certain region where the outer side rib shaped seal member (seal member) 51a includes a sealing contact face 32D which contacts against the cathode side insulating portion 32, a portion 47b of the cell side terminal 47 is embedded within the resin portion 32a.

The reason for the portion 47b of the cell side terminal 47 to be embedded within the resin portion 32a is that if it were to be exposed, at the sealing contact face 32D where the outer side rib shaped seal member 51a contacts against the cathode side insulating portion 32, to the inner circumferential side inner surface 32A like the inner circumferential side end portion 47a which contacts the membrane electrode assembly 2, then it would be unavoidable for a gap or a step to be generated at the joining portion between the resin portion 32a and the cell side terminal 47, and a path would become available for gas between the inside and the outside due to the existence of this gap or the like, which would be most undesirable.

In this embodiment there is no generation of concavities and convexities at the sealing contact face 32D, since the cell side terminal 47 is buried within the resin portion 32a at least at the sealing contact face 32D which is contacted by the outer side rib shaped seal member 51a.

If the structure is such that the cell side terminal 47 is not exposed to the sealing contact face 32D, then it is also acceptable for its one portion 47b to be once exposed to the outer surface side (the opposite side to the electrode surface portions 31A and 41A) of the resin portion 32a.

The outer perimeter side end portion 47c of the cell side terminal 47, or, to put it in another way, its portion more in the outer surface direction (the outer perimeter side) than the sealing contact face 32D where said outer side rib shaped seal member 51a contacts the insulating portion 32a, is exposed to both of the outer perimeter side inner surface 32B and the outer perimeter end surface 32C of the cathode side insulating portion 32, and at least one of these exposed portions is connected to a cell voltage measurement device side terminal (hereinafter termed the "measurement side terminal 61").

This outer perimeter side end portion 47c may also be exposed only at one or the other of these surfaces, i.e. said outer perimeter side inner surface 32B and said outer perimeter end surface 32C.

At the surface on the opposite side to the sealing contact face 32D where the outer side rib shaped seal member 51a contacts against the cathode side insulating portion 32, in other words at the outer surface on the opposite side to the side of the electrode surface portions 31A and 41A, there are formed concave portions 34 which are dented inward by a stage more than the other portions.

Furthermore, on the inner circumferential side of the cathode side insulating portion 32, there are formed a stepped portion 35 where its outer surface is dented in by a stage, and a flange portion 36 which extends to the inward surface direction (the inner peripheral side) which is coplanar with said stepped portion 35.

And the cathode side insulating portion 32 and the cathode side electrically conductive portion 31 are mutually attached together via a connection portion 33 which is made from an elastic material such as silicon rubber or the like.

In other words, since generally the coefficient of thermal expansion is different for the electrically conductive material and for the material which is endowed with an insulating characteristic, accordingly, if the insulating portion 32 which is made from a material which is endowed with an insulating characteristic and the electrically conductive portion 31 which is made from an electrically conductive material were to be attached together directly, then when the temperature changed thermal stresses would be generated, and the sealing performance would be lost; but, in this embodiment, a good sealing performance is maintained, since it is possible for the connection portion 33 which is endowed with elasticity to absorb differences of thermal expansion between the two.

Next, the structure of the anode side insulating portion 42 will be explained.

A concave portion 37 is formed at roughly the central portion of the inner surface of the anode side insulating portion 42 (the surface on the side of the electrode surface portions 31A and 41A), and said rib shaped seal member 51 is fitted into this concave portion 37 to be unitary with said connection portion 43.

This rib shaped seal member 51 may also be a separate member from the connection portion 43.

And, in the rib shaped seal member 51, the rib shaped seal member 51a on the outer side presses at the position where said cell side terminal 47 is buried in the cathode side insulating portion 32, while, via the solid polymerelectrolyte layer 21 and the cathode side gas diffusion electrode 22, the rib shaped seal member 51b on the inner side presses against said inner circumferential side inner surface 32A where the cell side terminal 47 is exposed at the cathode side insulating portion 32.

In this manner, sealing of the anode gas is realized by the membrane electrode assembly 2 being sandwiched by the anode side insulating portion 42 and the cathode side insulating portion 32 via the rib shaped seal member 51b on the inner side, but, because of the sealing surface pressure which is generated due to the elastic restoring force of the rib shaped seal member 51b on the inner side thereof, the inner circumferential side end portion 47a of the cell side terminal 47 which is provided so as to be exposed at the inner circumferential side inner surface 32A of the cathode side insulating portion 32 is pressed against the membrane electrode assembly 2, so that the contact between this cell side terminal 47 and the membrane electrode assembly 2 is made to be more secure.

Figure 5:
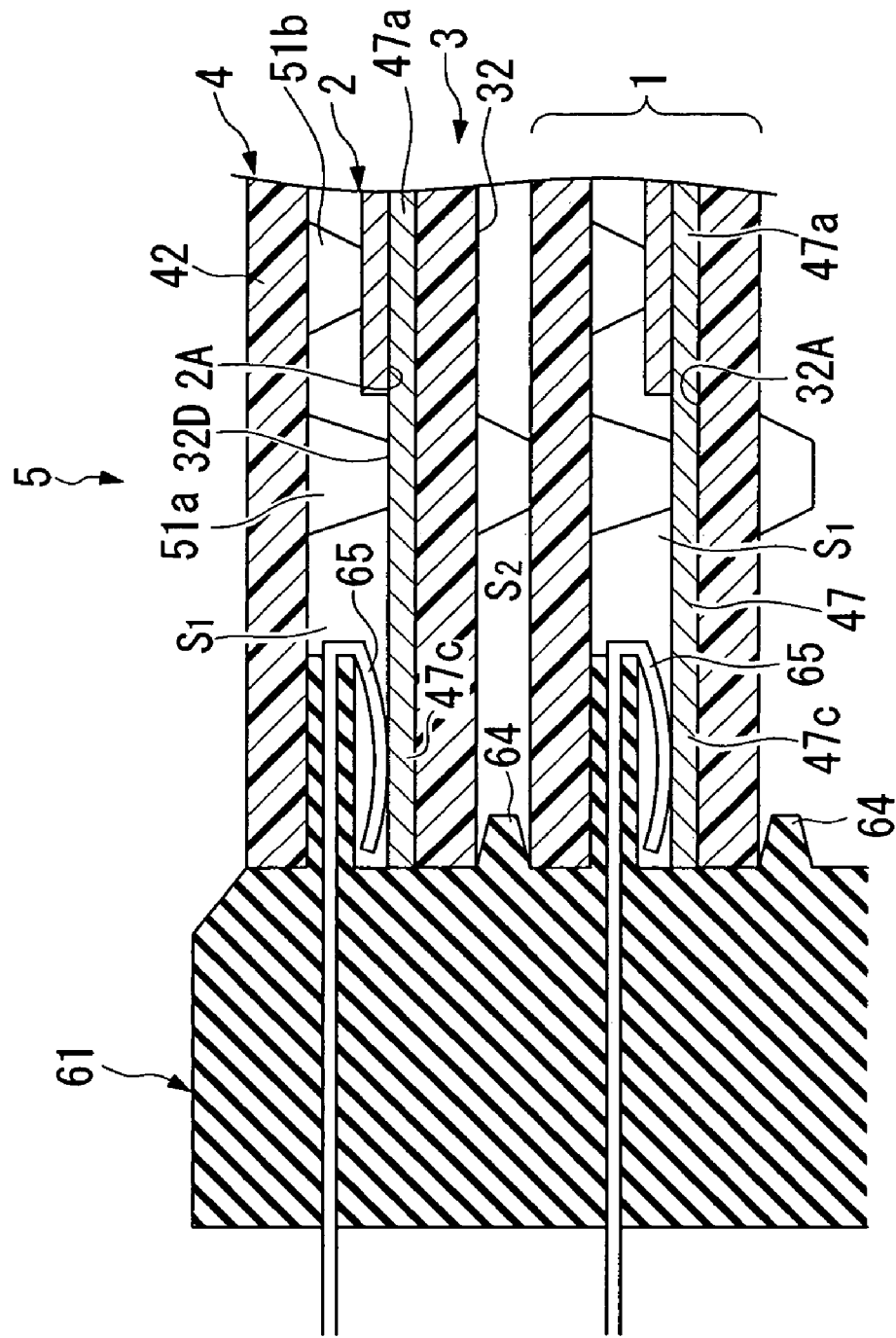
FIG. 5 is a vertical sectional view showing a connection construction between a terminal upon a cell voltage measurement device side and a terminal upon a fuel cell stack side, according to an embodiment of the present invention.
Figure 6:
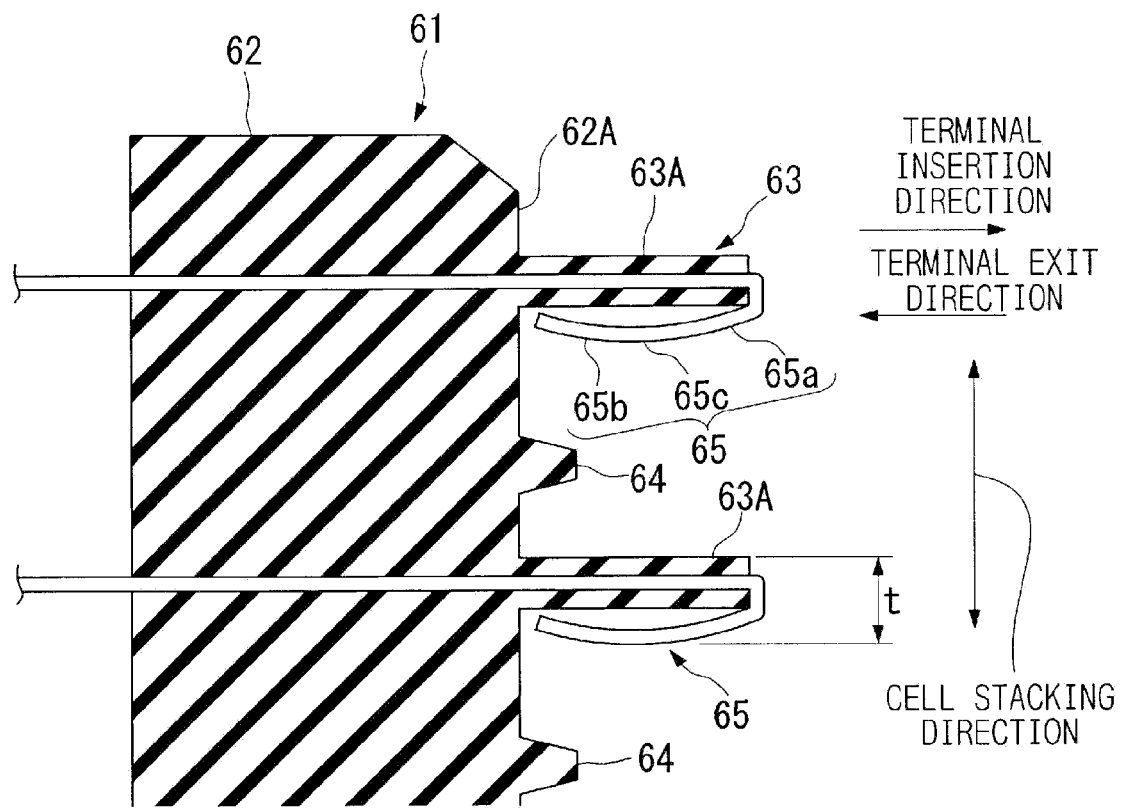
FIG. 6 is an enlarged view of the measurement side terminal shown in FIG. 5.
Figure 7:
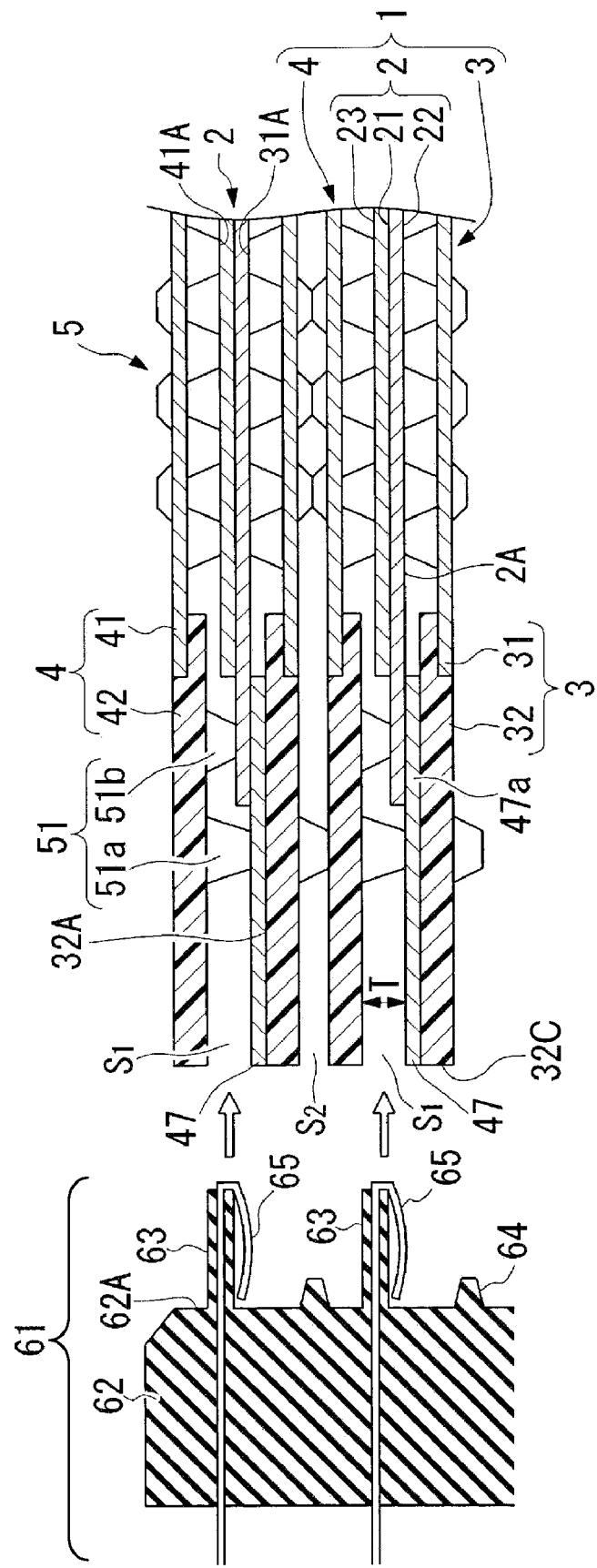
FIG. 7 is a vertical sectional view showing the situation before the terminal upon the cell voltage measurement device side shown in FIG. 5 is connected to the terminal upon the fuel cell stack side.

FIG. 5 is a vertical sectional view showing, for an embodiment of the present invention, a connection construction between a terminal on the cell voltage measurement device side and a terminal on the fuel cell stack side, and FIG. 6 is an enlarged view of the measurement side terminal shown in FIG. 5, while FIG. 7 is a vertical sectional view showing the situation before connection of the terminal on the cell voltage measurement device side to the terminal on the fuel cell stack side.

The unit fuel cell (hereinafter termed the "unit cell 1") comprises the membrane electrode assembly (MEA) 2 and the cathode side separator 3 and the anode side separator 4 which sandwich it. And a fuel cell stack, for example one for a vehicle, (hereinafter termed a "stack 5") is constructed by stacking up a large number of these unit cells 1.

The membrane electrode assembly 2 is made to comprise a solid polymerelectrolyte layer 21, a cathode side gas diffusion electrode 22 and an anode side gas diffusion electrode 23 which sandwich this solid polymerelectrolyte layer 21 from its outer sides, and a catalyst layer (not shown in the drawings) which includes platinum, and which is provided between this solid polymerelectrolyte layer 21 and the cathode side and the anode side gas diffusion electrodes 22 and 23.

Although, when the outer dimensions of the solid polymerelectrolyte layer 21 are taken as a standard, in this membrane electrode assembly 2, the cathode side gas diffusion electrode 22 is of roughly the same dimensions, it has a stepped construction, with the anode side gas diffusion electrode 23 being made of smaller dimensions.

In each of the cathode side separator 3 and the anode side separator 4, an electrically conductive portion 31, 41 which is made from a metallic material (for example, stainless steel, hastelloy, Inconel, Au, Cu, Ni, Al, Ti or the like) and an insulating portion 32, 42 which is provided so as to surround the outer perimeter of said electrically conductive portion 31, 41 and which is made from a resin material are mutually connected together.

This mutual connection may be made via the connection portion which is made from an elastic material such as, for example, silicon rubber or the like, with the objective of absorbing thermal expansion difference between the electrically conductive portions 31, 41 and the insulating portions 32, 42. In this case, the electrically conductive portions 31, 41 and the insulating portions 32, 42 are not limited to a construction in which they are entirely separated by the connection portion; a construction would also be acceptable in which at least portions of the electrically conductive portions 31, 41 were set into the insulating portions 32, 42.

By press forming each of the cathode side and anode side electrically conductive portions 31, 41 from a metallic plate, they are formed, in cross section, in wavy shapes in which planar hill portions and valley portions mutually repeatedly alternate with one another. The valley portion outer surfaces of the electrically conductive portions 31, 41 are put into surface contact with the outer surfaces of the membrane electrode assembly 2 and sandwich them between them, so that said contact surfaces constitute electrode surface portions 31A and 41A of the separators 3 and 4.

These electrically conductive portions 31 and 41 are not limited to being made from a metallic material; it would be acceptable for them to be made from an electrically conductive material such as carbon or an electrically conductive resin or the like.

The measurement side terminal 61, as shown in FIG. 6, is made from: a main body portion 62 which is made from, for example, resin or the like; a plurality of electrode holding portions 63 and spacer portions 64 which project in the terminal insertion direction (the direction indicated in FIG. 7 by the white arrow signs) from its front surface 62A, in other words its surface which confronts the stack 5 during connection; and terminal electrodes 65 which pass through said main body portion 62 and said electrode holding portions 63 in that order and come to be turned back at the tip end surfaces of the electrode holding portions 63 in the terminal exit direction.

The electrode holding portions 63 and the terminal electrodes 65 are inserted into the gaps S1 which are formed between the cathode side separator 3 and the anode side separator 4 which make up each one unit cell 1.

Furthermore, the spacer portions 64 are inserted into the gaps S2 between the unit cells 1, in other words into the gaps which are formed between the cathode side separator 3 of one unit cell 1 and the anode side separator 4 of another neighboring unit cell 1.

The spacer portions 64, along with facing in the terminal insertion direction, are made to be of shapes which taper in trapezoidal vertical cross section, so that their dimensions in the cell stacking direction gradually get smaller.

The terminal electrodes 65 are formed as curves in circular arcuate shapes from a material which has springiness (elasticity), and, along with respectively comprising sloping surface portions 65a and 65b on the input aperture side when the terminal is inserted and on the output aperture side when the terminal is pulled out, they comprise bulging portions 65c between these sloping surface portions 65a and 65b, which bulge to the outwards along the direction of stacking of the fuel cells.

And the separation dimension t in the direction of stacking of the fuel cells between the outermost surface of the bulging portion 65c and the surface 63A which contacts the insulating portion 42 of the electrode holding portion 63 is set so as to be larger than the gap dimension T between the cathode side and anode side insulating portions 32 and 42.

When the measurement side terminal 61 is inserted between the insulating portions 32 and 42 in order to connect it to the cell side terminal 47, the bulging portions 65c of the terminal electrodes 65 are inserted into the gaps S1 between the opposing insulating portions 32 and 42 while being elastically deformed so that their said separation dimension t becomes equal to the dimension T of the gaps—in other words, while being elastically compressed in their gap directions.

Accordingly, the terminal electrodes 65 press against the outer perimeter side end portions 47c of the cell side terminals due to the elastic restoring force in the direction of said gaps, and are tightly contacted to said outer perimeter side end portions 47c.

Since at this time the spacer portions 64 are inserted into the gaps S2 between neighboring ones of the unit cells 1, accordingly warping of the cathode side and the anode side insulating portions 32 and 42 as they receive the elastic restoring force of the terminal electrodes 65 is effectively prevented.

Furthermore, due to these sloping surface portions 65a and 65b, the terminal electrodes 65 do not experience any catching action, and can be smoothly inserted and taken out between the insulating portions 32 and 42.

As has been explained above, according to the separators 3 and 4 of this embodiment, the unit cell 1 which comprises said separators 3 and 4, and the stack 5 which consists of a plurality of said unit cells 1 stacked together, since the electrical continuity between the interiors of the cells and the interior and exterior of the stack is ensured if the measurement side terminal 61 is inserted between the cathode side and the anode side insulating portions 32 and 42 and is connected to the outer perimeter side end portions 47c of the cell side terminals 47, accordingly it becomes possible to measure the cell voltages from the exterior, while maintaining the insulation characteristic with the communication holes portion and the exterior, and without hindering the sealing performance.

Moreover, with respect to disturbance such as when, due to vibration or shock or the like, the measurement side terminal is mutually separated from the stack 5, cell voltage measurement can still be performed at high accuracy, since the reliability of the electrical connection is maintained.

Furthermore since, because of the sealing surface pressure due to the inner side rib shaped seal member 51b, it is possible to generate sufficient contact pressure for cell voltage measurement between the cell side terminal 47 and the membrane electrode assembly 2, accordingly the contact resistance is reduced, and it becomes possible to perform accurate measurement.

Yet further, since the cell side terminal 47 avoids the vicinity of the input aperture side and the output aperture side cooling water communication holes 36a and 36b and is disposed between the input aperture side oxidizer gas communication holes 34a, 34a, accordingly it is possible effectively to prevent electrical leakage (seepage) from the cooling water.

Furthermore, when the cell side terminal 47 is insert formed in the resin portion 32a, since a portion 47b of the cell side terminal 47 is embedded in the interior of the resin portion 32a at the sealing contact face 32D at which the rib shaped seal member 51a on the outer side contacts the cathode side insulating portion 32, accordingly the benefit is obtained of effectively preventing formation of concave and convex shapes upon the sealing line, so that it is possible to count upon an enhancement of the reliability of sealing.

Furthermore, since a construction which absorbs thermal stresses is implemented by connecting the electrically conductive portions 31, 41 and the insulating portions 32, 42 which have mutually differing coefficients of thermal expansion via the connection portion 33 which is made from an elastic material such as silicon rubber or the like, accordingly the occurrence of fracture at the connecting boundary surface or failure of the seal is eliminated.

The present invention is not limited to these embodiments; for example, it would be possible to employ the constructions detailed below.

(1) It would also be acceptable, instead of obtaining the cell potential for each of the unit cells 1 by connecting a measurement side terminal 61 to each of the unit cells 1, to connect a measurement side terminal 61 for each of n cells (where n is an integer greater than or equal to 1).

(2) It would also be acceptable, instead of contacting the inner circumferential side end portion 47a of the cell side terminal 47 to the cathode side exterior surface 2A of the membrane electrode assembly 2, to contact it to the anode side outer surface or the electrically conductive portions 31, 32 of the separators 3, 4 of the membrane electrode assembly 2.

(3) It would also be acceptable to position the most outward perimeter end of the cell side terminal 47 more to the inner circumferential side than the outer perimeter end surface 32C of the insulating portion 32, provided that it were to be possible to connect it to the measurement side terminal 61.

(4) It would also be acceptable to provide the cell side terminal 47 in the anode side insulating portion 31, instead of in the cathode side insulating portion 32, or as well as in the cathode side insulating portion 32.

Figure 4:
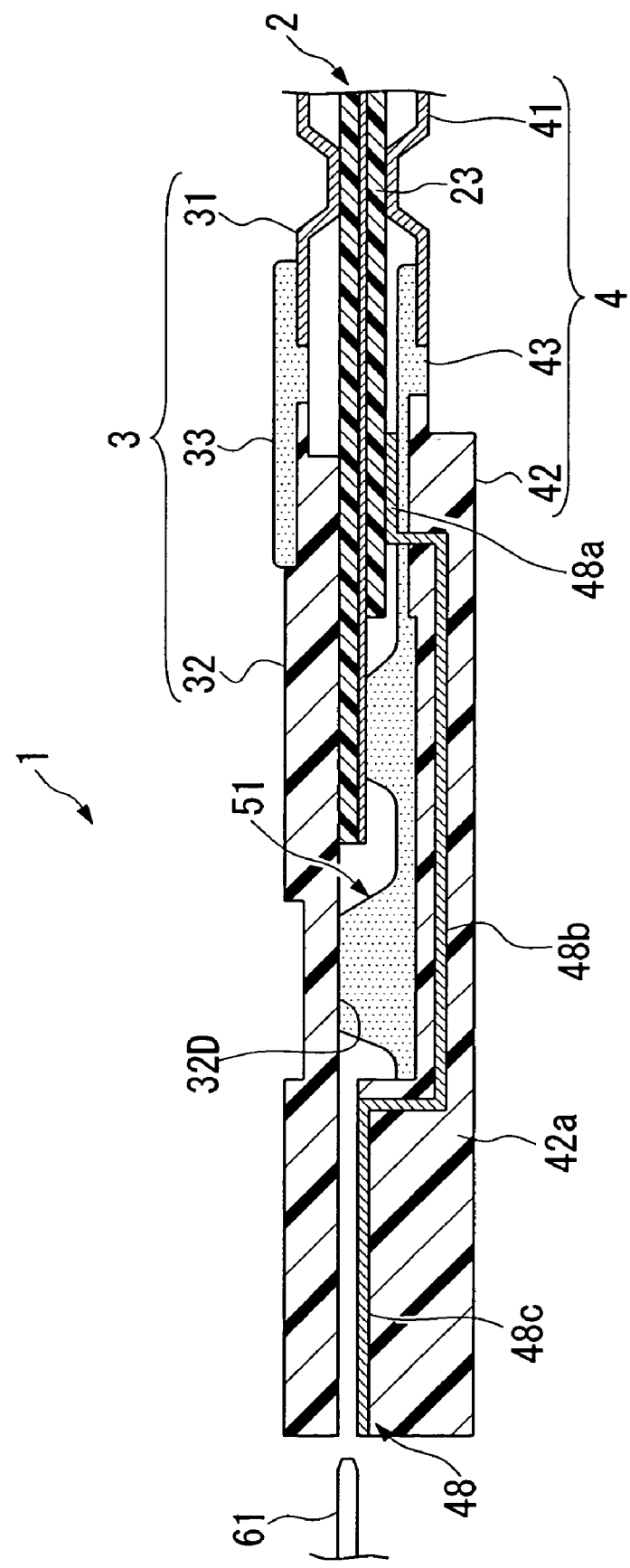
FIG. 4 is a vertical sectional view showing a portion of a fuel cell according to another embodiment of the present invention.

In such a case, as for example shown in FIG. 4, it would be acceptable to expose the inner circumferential side end portion 48a and the outer perimeter side end portion 48c of the cell side terminal 48 at the inner surface side of the resin portion 42a, while embedding the other portion 48b thereof in the interior of the resin portion 42a.

(5) It would also be acceptable to form the resin portion 32a of the cathode side insulating portion 32 in advance, and, instead of providing the cell side terminal 47 in the resin portion 32a by using some type of surface processing method, to provide the cell side terminal 47 by insert forming a metal plate or the like when forming the resin portion 32a.

(6) It would also be acceptable, instead of insert forming the cell side terminal 47 which is made of a metallic plate when forming the resin portion 32a of the cathode side insulating portion 32, to form only the resin portion 32a, which constitutes the main body of the cathode side insulating portion 32, in advance by injection molding or the like, and to provide an inside to outside junction terminal by partially plating an electrically conductive material upon this resin portion 32a, or by performing some type of surface processing thereupon such as PVD or CVD or the like.

Furthermore, it would also be acceptable to adhere to the resin portions 32a a metallic foil which was manufactured in advance.

(7) The electrically conductive portions 31, 41 and the insulating portions 32, 42 are not limited to the construction in which they are completely separated by the connection portions 33, 43; a construction would also be acceptable in which at least certain portions of the electrically conductive portions 31, 41 were inserted into the insulating portions 32, 42.

(8) In the membrane electrode assembly 2, the cathode side gas diffusion electrode 22 and the anode side gas diffusion electrode 23 may both be of the same dimensions.

What is claimed:

1. A separator for a fuel cell comprising an electrically conductive portion comprising an electrode surface portion, and an insulating portion which surrounds the electrically conductive portion, wherein
in the insulating portion, there is provided an inside to outside junction terminal which extends from an inner circumferential side to an outer perimeter side of the insulating portion so that at least a portion of an inner circumferential side end portion of the inside to outside junction terminal contacts and extends along an outer surface of the insulating portion and is located between the insulating portion and an electrode that contact the electrode surface portion of the electrically conductive portion.

2. A separator as described in claim 1, wherein at least a portion of the inside to outside junction terminal is embedded in the insulating portion.

3. A separator as described in claim 2, wherein the inside to outside junction terminal is embedded in the insulating portion at a sealing contact face of the insulating portion.

4. A separator as described in claim 1, further comprising a connection portion made of an elastic material between the electrically conductive portion and the insulating portion.

5. A separator as described in claim 1, wherein the insulating portion comprises connection holes which conduct a reaction gas or a cooling medium.

6. A fuel cell which comprises a membrane electrode assembly to which electrodes are provided on both sides of an electrolyte, and a pair of separators which sandwich the membrane electrode assembly, wherein a separator as described in claim 1 is utilized for at least one of the separators.

7. A fuel cell comprising:
a membrane electrode assembly in which electrodes are provided on both sides of an electrolyte; and
a pair of separators, each of which comprises an electrically conductive portion having electrode surface portions and an insulating portion which surrounds the electrically conductive portion, the pair of separators sandwiching the membrane electrode assembly, wherein
in at least one separator of the pair of separators, the insulating portion provides an inside to outside junction terminal which extends from an inner circumferential side to an outer perimeter side of the insulating portion, and an inner circumferential side end portion of the inside to outside junction terminal is located between the insulating portion and at least one of the electrodes of the membrane electrode assembly, and wherein the inner circumferential side end portion of the inside to outside junction terminal contacts the membrane electrode assembly.

8. A fuel cell as described in claim 7, wherein the inner circumferential side end portion of the inside to outside junction terminal contacts a first side of the membrane electrode assembly, and
a seal member is provided that contacts a second opposite side of the membrane electrode assembly.

9. A fuel cell as described in claim 7, wherein the insulating portions comprise communication holes which conduct a reaction gas or a cooling medium.

10. A connection construction between a cell voltage measurement device side terminal and a fuel cell side terminal, used in a fuel cell as described in claim 7, wherein, at the terminal on the cell voltage measurement device side, there is provided a terminal electrode which is inserted in between the insulating portions of the pair of mutually opposing separators in a state in which it is elastically compressed in a gap direction between the insulating portions, and is pressed against the outer perimeter side end portion of the inside to outside junction terminal due to an elastic restoring force.

11. A connection construction between a cell voltage measurement device side terminal and a fuel cell side terminal as described in claim 10, wherein the insulating portions comprise communication holes which conduct a reaction gas or a cooling medium.

12. The separator as described in claim 1, further comprising a connection portion separate from the insulating portion,
wherein a side of the connection portion contacts a first surface of the insulating portion and the inside to outside junction terminal contacts a second opposite surface of the insulating portion, and
wherein the side of the connection portion further contacts the electrically conductive portion.

13. The separator as described in claim 12, wherein
the electrically conductive portion of the separator comprises a metal plate having a wave form cross section, the wave form cross section including alternating flattened hill portions and valley portions, and
wherein the electrode surface portion of the electrically conductive portion comprises the valley portions, wherein the valley portions contact the electrode.

14. The fuel cell as described in claim 7, each separator further comprising a connection portion separate from the insulating portion,
wherein a side of the connection portion contacts a first surface of the insulating portion and the inside to outside junction terminal contacts a second opposite surface of the insulating portion, and
wherein the side of the connection portion further contacts the electrically conductive portion.

15. The fuel cell as described in claim 14, wherein
the electrically conductive portion of the separator comprises a metal plate having a wave form cross section, the wave form cross section including alternating flattened hill portions and valley portions, and
wherein the electrode surface portion of the electrically conductive portion comprises the valley portions, wherein the valley portions contact an electrode of the membrane electrode assembly.

* * * * *